UNITED STATES PATENT OFFICE.

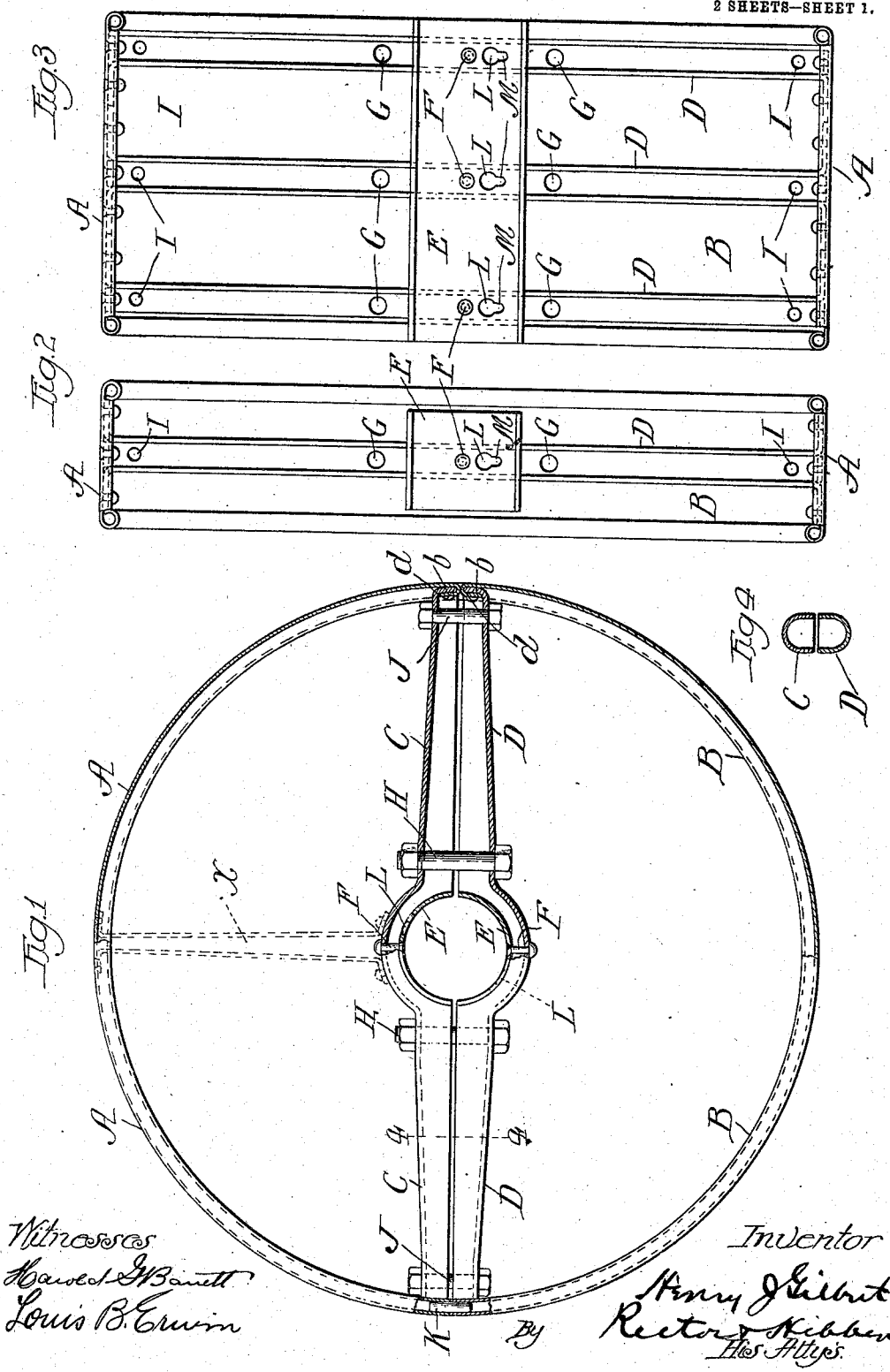

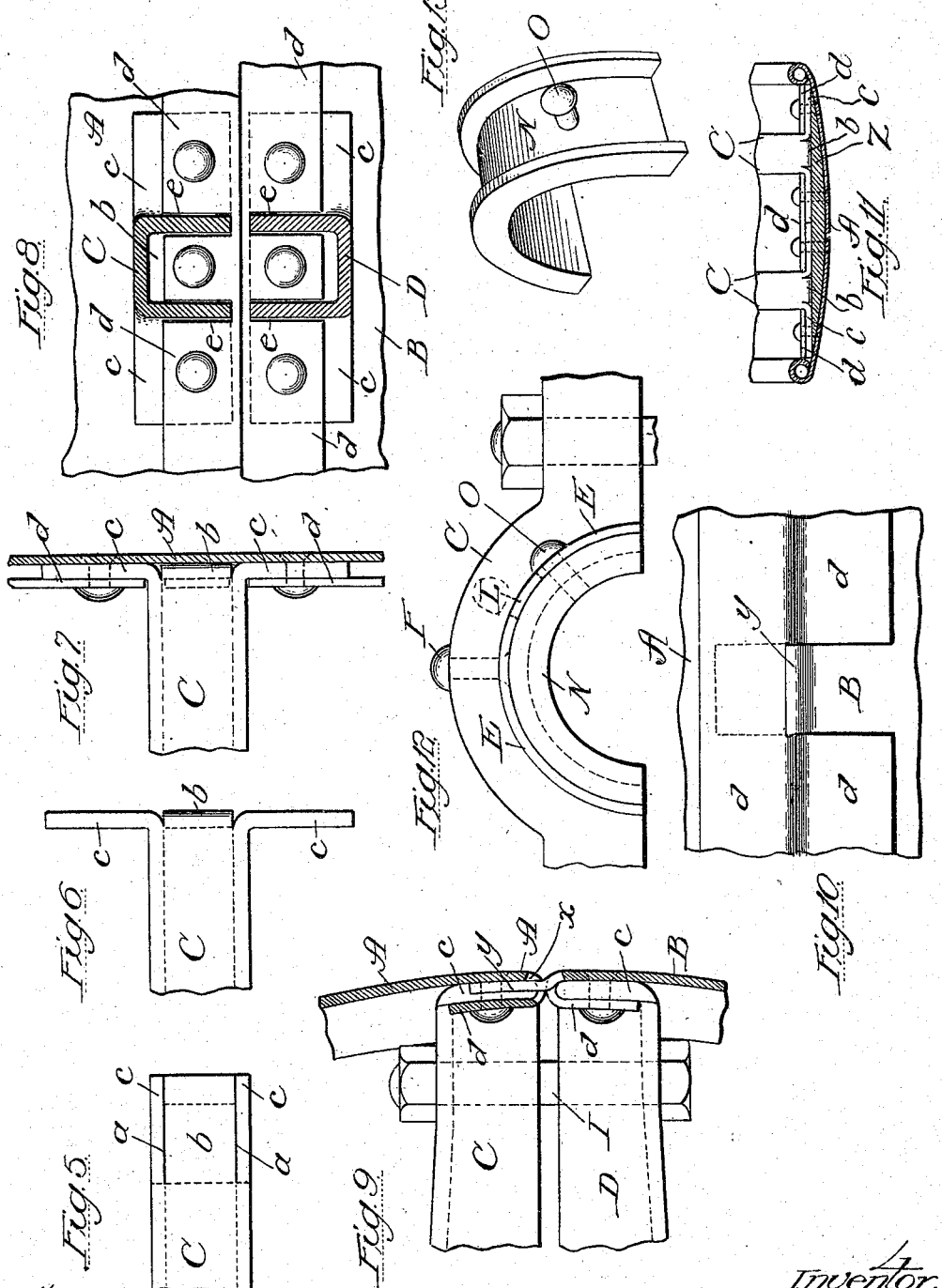

HENRY J. GILBERT, OF SAGINAW, MICHIGAN.

PULLEY.

No. 840,763.  Specification of Letters Patent.  Patented Jan. 8, 1907.

Application filed June 9, 1903. Serial No. 160,730.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a description, reference being had to the accompanying drawings, forming part of this specification.

My invention relates more specifically to pulleys constructed of sheet metal, and has for one of its objects the production of a sheet-metal pulley of such construction that a pulley of any desired width of face may be readily built up from uniform spoke and hub construction, whereby the provision of differing spoke and hub constructions for pulleys of different widths is rendered unnecessary.

Another object of my invention is the provision of more efficient spoke and rim connections of sheet-metal pulleys than have heretofore been devised.

A third object of my invention is the provision of novel interchangeable bushings for sheet-metal pulleys and means for detachably connecting such bushings with the hub of the pulley.

My invention has for further objects increased simplicity and economy of construction and increased durability and efficiency of operation of pulleys of this character.

In the accompanying drawings, Figure 1 is a side elevation, partly in section, of one form of my improved pulley; Fig. 2, a bottom plan view of the upper half of said pulley; Fig. 3, a view corresponding to Fig. 2, but showing a wider-faced pulley employing a plurality of sets of spoke-arms; Fig. 4, a cross-sectional detail on the line 4 4 of Fig. 1, showing the shape of the spoke-arms in cross-section; Fig. 5, a detail of the rim end of one of the spoke-arms prior to the bending of its rim-engaging end tongues; Fig. 6, a view corresponding to Fig. 5, showing the end of the spoke-arm in its final shape; Figs. 7 and 8, details of the rim connections of said spoke-arms; Figs. 9 and 10, details of the rim connections; Fig. 11, a sectional detail of the spoke and rim connection for crown-faced pulleys; Fig. 12, a side elevation of the hub portion of the pulley of Fig. 1 with an interchangeable bushing in position in it, and Fig. 13, a perspective detail of the bushing shown in Fig. 12.

The same letters of reference are used to indicate identical parts in the several views.

Under the construction illustrated in Fig. 1 of the drawings the rim of my improved pulley is composed of two semicircular halves A B, which abut together at their meeting ends to form the complete circular rim. The blank for each of these half-rims is of somewhat greater length than is necessary to form the semicircular half-rim of the pulley, and the ends of these blanks are bent inwardly and backwardly parallel with the outer face of the pulley-rim to form sockets or recesses to receive the ends of the spoke-arms. The spoke-arms C D extend from side to side of the pulley parallel with each other, and the opposite ends of each arm are secured to the ends of the corresponding half-rim of the pulley. These spoke-arms are formed in suitable dies from blanks of sheet metal and in cross-section are approximately U-shaped, as shown in Fig. 4. Each arm consists of a curved hub portion and two radially-extending portions leading from such hub portion to the ends of the half-rim to which the spoke-arm is secured. The hub portions of these spoke-arms may fit directly upon the shaft or interposed bushing, (where bushings are employed;) but I prefer to secure each of them to a half-thimble E of slightly-less extent than a half-circle by a rivet F. Upon opposite sides of their hub portions each pair of spoke-arms is provided with coincident bolt-holes G, Figs. 2 and 3, for the passage of the clamping-bolts H, by means of which the slightly-separated spoke-arms and the half-rims carried by them are clamped to the shaft upon which the pulley is to be used.

The formation of the ends of the spoke-arms for attachment to the rim-sections in the manner shown in Fig. 1 will be understood by reference to Figs. 5 and 6, where it will be seen that the flattened top of the spoke-arm is slit backward from its end along the lines $a\ a$, thereby forming a middle tongue $b$ and two side tongues $c$, after which the two side tongues are bent outwardly or laterally at right angles to the sides of the spoke-arm, as in Fig. 6, while the middle tongue $b$ is bent downwardly at right angles to the upper side of the spoke-arm and into the same plane as the laterally-projecting tongues $c$. All three of these tongues fit into the socket or recess formed by the inturned flange $d$ of the pulley-rim, as shown in Fig. 7, the middle tongue $b$ fitting in said socket in line with the body of the spoke-arm and being riveted therein, as shown in Figs. 1, 2, and 3, while the laterally-projecting tongues $c$ are embraced by the inturned flange of the rim at opposite sides of the body of the spoke-arm and riveted thereto. As shown in Fig. 8, the flange of the pulley-rim is provided with suitable slots $e$ coincident with the sides of the spoke-arm to permit the engagement of the tongues of the spoke-arm with the socket or recess formed by the flange in the manner described. In practice spoke-arm blanks of considerably greater length than the diameter of the pulley will preferably be employed in order to provide relatively long laterally-projecting tongues $c$, and the middle tongue $b$ will be cut away or made shorter, as indicated by the dotted line in Fig. 5, so as to fit properly in the socket formed for it by the flange of the pulley-rim. The laterally-projecting tongues $c$ $c$ may be made of sufficient length to extend approximately the entire width of the pulley-rim in single-armed narrow-faced pulleys, as in Fig. 2, and to extend into proximity to or contact with the tongues of the adjacent spoke-arms when a plurality of sets of spoke-arms are employed in a wide-faced pulley, as in Fig. 3. In event the outer pairs of spoke-arms in such wide-faced pulley are set near the edge of the pulley-rim, as in Fig. 3, the outwardly-projecting flanges $c$ of such spoke-arms may be omitted, as there shown.

Near their outer ends the spoke-arms C D are provided with coincident bolt-holes I, Figs. 2 and 3, for the reception of the clamping-bolts J, by means of which the meeting ends of the rim of the pulley are secured together. The opposite edges of the pulley-rim are rolled into tubular form and connected by dowel-pins K at their meeting ends, as shown at the left side of the pulley in Fig. 1, to resist sidewise or torsional strain upon the two halves of the pulley. For the purpose of further strengthening wide-faced pulleys against such strains I provide the arrangement shown in Figs. 9 and 10, where it will be seen that the meeting end of one rim is provided with a slot or opening $x$ to receive a tongue $y$, formed upon and projecting from the meeting end of the opposite rim, said tongue being formed by slitting the inturned flange $d$ of the latter rim and bending it outward into approximately the plane of the rim.

For crown-faced pulleys I provide the arrangement shown in Fig. 11, where I employ a crowning-piece Z, interposed between the outer ends of the spoke-arms and the rim of the pulley, the rivets which attach the rim to the spoke-arms passing through this piece. The length of these crowning-pieces Z will correspond or be proportionate to the width of the face of the pulley, while their width will preferably be about the same as the width of the end flanges $c$ of the spoke-arm. In the pulley shown in the drawings four such crowning-pieces would be employed, two in each half of the pulley, between the opposite ends of the spoke-arms and the adjacent ends of the half-rim.

Under the foregoing construction a narrow-faced pulley may be built up of a pair of half-rims and a single pair of parallel spoke-arms, as in Figs. 1 and 2, or a wide-faced pulley may be built up of a pair of wider half-rims and a plurality of pairs or sets of the same spoke-arms, as in Fig. 3, in which latter case the half-thimbles E will preferably be of sufficient length to connect the spoke-arms of all of the pairs employed. In this manner and by these means, therefore, pulleys of any desired width of face may be readily constructed by employing a sufficient number of pairs of spoke-arms of uniform size, shape, and construction so that for all pulleys of a given diameter it will suffice to provide a single standard construction of spoke-arms. Pulleys of this character are nearly always employed in connection with interchangeable bushings, by means of which a pulley of given shaft-bore may be applied to shafts of varying diameters less than such bore, and in Figs. 12 and 13 I have illustrated a novel construction and application of such bushings. These bushings N, of the shape shown in Fig. 13, may be formed in dies of sheet metal, and for all pulleys employing more than a single pair of spoke-arms the bushings are or may be identical with each other excepting in diameter, such bushings being preferably of approximately the same width as the spoke-arms. In narrow-faced pulleys employing a single pair of spoke-arms wider bushings will preferably be provided, approximately of the same width as the length of the hub-thimbles of the spoke-arms. For convenience in assembling these bushings in the hub of a wide-faced pulley and holding them in proper position while the pulley is being applied to the shaft, as well as for convenience in attaching the bushings to the pulley-hubs for purposes of transportation or otherwise, I provide novel means for detachably connecting each half-bushing with the half-thimble of the spoke-arms in which it fits. For this purpose I provide each of the half-thimbles E with a circular opening L, having a narrow offset opening M, Figs. 2 and 3, and I secure to each half-bushing a suitable engaging and connecting device to coöperate with this opening in the thimble. Such device may consist of a button-head rivet O, Figs. 12 and 13, of such length and secured to the bushing in such position that when the bushing is applied to the hub the head of the rivet may pass through the opening L in the hub-thimble and the bushing be then turned to normal position in the hub and the stem of the rivet caused to enter the narrow offset opening M, as in Fig. 12, so that the head of the rivet will then serve to connect the bushing with the thimble and hold it in position. The bushing may be readily detached by turning it backward in the hub; but otherwise it is securely connected to the hub for purposes of assemblage and transportation.

The foregoing construction is efficient for pulleys of small and medium size; but for pulleys of larger size it is desirable to employ additional spoke-arms radiating from the hub of the pulley at right angles to the spoke-arms above described. For this purpose independent auxiliary spoke-arms, secured at their inner ends to the hubs of the main spoke-arms and at their outer ends to the pulley-rim, may be employed, as indicated by the dotted lines X in Fig. 1; but I have devised a better construction and arrangement for the purpose and made the same the subject-matter of a separate application for Letters Patent.

Having thus fully described my invention, I claim—

1. A separable pulley comprising sheet-metal rim-segments, a plurality of sets of spoke-arms of uniform construction formed of sheet metal and secured in said rim-segments, half-thimbles in the shaft-opening of the hub portions of the spoke-arms, formed of sheet metal, and secured to and permanently connecting the several sets of arms, and clamping-bolts for securing the pulley-halves to the shaft; substantially as and for the purpose described.

2. A separable pulley comprising sheet-metal rim-segments, a plurality of sets of spoke-arms of uniform construction formed of sheet metal and secured in said rim-segments, and each composed of a hub portion and integral radial arms, half-thimbles in the shaft-opening of the hub portions of the spoke-arms formed of sheet metal and secured to and permanently connecting the several sets of arms, and clamping-bolts for securing the pulley-halves to the shaft; substantially as and for the purpose described.

3. A separable pulley comprising sheet-metal rim-segments, a plurality of sets of sheet-metal spoke-arms of uniform construction secured in said rim-segments, each spoke-arm being of approximately U shape in cross-section and comprising a hub portion and two integral radially-extending arms secured at their outer ends to the rim-segments, half-thimbles in the shaft-opening of the hub portions of the spoke-arms formed of sheet metal and secured to and permanently connecting the several sets of arms, and clamping-bolts for securing the pulley-halves to the shaft; substantially as and for the purpose described.

4. A separable pulley comprising the sheet-metal half-rims A B, the spoke-arms C D formed of sheet metal approximately U-shaped in cross-section and comprising the hub portions and the radially-extending arms secured at their outer ends to the half-rims, and the half-thimbles E E formed of sheet metal and permanently secured in the hub portions of the spoke-arms; substantially as described.

5. A sheet-metal pulley comprising rim-segments having their meeting ends bent inward and backward to form sockets or recesses, and spoke-arms provided with suitably-shaped ends to engage such sockets and riveted to the rim; substantially as described.

6. A sheet-metal pulley comprising rim-segments having their meeting ends bent inward and backward to form sockets or recesses, and sheet-metal spoke-arms provided with laterally-projecting end tongues fitting in said sockets and riveted to the rim; substantially as described.

7. A sheet-metal pulley comprising rim-segments having their meeting ends bent inward and backward to form sockets or recesses, and sheet-metal spoke-arms provided with end tongues bent vertically or circumferentially of the pulley and fitting in said sockets and riveted to the rim; substantially as described.

8. A sheet-metal pulley comprising rim-segments having their meeting ends bent inward and backward to form sockets or recesses, and sheet-metal spoke-arms provided with laterally and vertically projecting end tongues fitting in said sockets and riveted to the rim; substantially as described.

9. A sheet-metal pulley comprising rim-segments having their meeting ends bent inward and backward to form the flanges $d$ and inclosed sockets or recesses, and the sheet-metal spoke-arms approximately U shape in cross-section and having their ends slit and bent outward to form the tongues $c$ fitting in said sockets and riveted to the rim; substantially as described.

10. A sheet-metal pulley comprising rim-segments having their meeting ends bent inward and backward to form the flanges $d$ and inclosed sockets or recesses, and the sheet-metal spoke-arms approximately U shape in cross-section and having their ends slit and bent laterally and vertically to form the tongues $c$ and $d$ fitting in said sockets and riveted to the rim; substantially as described.

11. The herein-described separable pulley, comprising the sheet-metal half-rims A B having their meeting ends bent inward and backward to form the flanges $d$ and inclosed sockets or recesses, and the pair of parallel spoke-arms C D, formed of sheet metal, approximately U-shaped in cross-section, and comprising the hub portions and the radially-extending parallel arms, the outer ends of said arms being slit and bent to form the tongues *b c* fitting in the sockets in the meeting ends of the rim and riveted thereto; substantially as described.

12. The herein-described separable pulley comprising the sheet-metal half-rims A B having their meeting ends bent inward and backward to form the flanges *d* and inclosed sockets or recesses, the pair of parallel spoke-arms C D, formed of sheet metal, approximately U-shaped in cross-section and comprising the hub portions and the radially-extending parallel arms, the outer ends of said arms being slit and bent to form the tongues *b c* fitting in the sockets in the meeting ends of the rim and riveted thereto, and the half-thimbles E E secured in the hub portions of the respective spoke-arms; substantially as described.

13. The herein-described separable pulley, comprising the sheet-metal half-rims A B, having their meeting ends bent inward and backward to form the flanges *d* and inclosed sockets or recesses, the plurality of pairs of parallel spoke-arms C D, each spoke-arm formed of sheet metal, approximately U-shaped in cross-section, and comprising a hub portion and the radially-extending parallel arms slit and bent at their outer ends to form the tongues *b c* fitting in the sockets in the meeting ends of the rim and riveted thereto, and the half-thimbles E E secured in the hub portions of the respective spoke-arms and connecting the arms of the several pairs; substantially as described.

14. In a sheet-metal pulley, the rim-sections having their meeting ends bent inward and backward to form the inturned flanges *d d*, one of said meeting ends being provided with the opening *x* and the other having the tongue *y* cut from its flange *d* and passed through said opening *x*; substantially as described.

15. In a crown-faced sheet-metal pulley, the combination of the rim-segments, the spoke-arms provided at their outer ends with the rim-connecting tongues, and the crowning-pieces Z interposed between said tongues and rim and riveted thereto; substantially as described.

16. In a crown-faced sheet-metal pulley, the combination of the rim-segments, the U-shaped sheet-metal spoke-arms slit and bent at their outer ends to form the rim-connecting tongues *b c*, and the crowning-pieces Z having approximately straight or flat inner faces fitting against said tongues and convex outer faces conforming to the crown of the pulley and riveted between the tongues and rim; substantially as described.

17. In a separable pulley, the combination, with the separable portions of the pulley, of separable bushings, and means for detachably securing said bushings in the hubs of the respective portions of the pulley while said portions are separate from each other, so that in assembling the pulley upon a shaft the bushings will be held in place in the hub portions of the pulley by the means connecting them therewith; substantially as described.

18. A separable pulley having its hub portions provided with recesses or openings, in combination with separable bushings provided with devices to engage the recesses or openings in the hub portions of the pulley and detachably secure the bushings therein while the pulley portions are separate from each other; substantially as and for the purpose described.

19. A sheet-metal pulley having its hub provided with an opening L and offset M therefrom, in combination with a bushing N having the headed projection O adapted to coöperate with said opening and offset in the manner and for the purpose described.

20. The herein-described sheet-metal pulley having the half-thimbles E secured in its opposite hub portions and provided with the openings L having the offsets M, in combination with the bushings N provided with the headed projections O coöperating with said openings and their offsets, as described.

HENRY J. GILBERT.

Witnesses:
EDWARD RECTOR,
LOUIS B. ERWIN.